United States Patent [19]
Gardner

[11] 3,940,557
[45] Feb. 24, 1976

[54] SUBTRACTIVE IMAGE ANALYSIS

[75] Inventor: Gerald Marvin Gardner, Saffron Walden, England

[73] Assignee: Image Analysing Computers Limited, England

[22] Filed: Feb. 18, 1975

[21] Appl. No.: 550,737

[30] Foreign Application Priority Data
Feb. 20, 1974 United Kingdom................. 7995/74
Feb. 22, 1974 United Kingdom................. 8346/74

[52] U.S. Cl............................. 178/6.8; 178/DIG. 36
[51] Int. Cl.²............................................. H04N 1/18
[58] Field of Search...................... 178/6.8, DIG. 36; 235/92 PC, 92 MT, 92 DN

[56] References Cited
UNITED STATES PATENTS

| | | | |
|---|---|---|---|
| 3,811,036 | 5/1974 | Perry | 235/92 PC |
| 3,891,797 | 6/1975 | Finnell | 178/6.8 |

*Primary Examiner*—Howard W. Britton
*Attorney, Agent, or Firm*—Oblon, Fisher, Spivak, McClelland & Maier

[57] ABSTRACT

A method and apparatus is described for performing controlled erosion of electrical signals relating to detected features in an image which is scanned. The erosion is performed by counting (in an up or down counter) $n$ timing pulses in each sequence corresponding to a detected signal pulse before an overflow signal indicating that $n$ timing pulses have been received is generated. The overflow signal is used to release subsequent timing pulses which are then analysed by counting. The timing pulses so released correspond to the portion of a detected feature left after erosion from the leading edge.

The method is applied parallel, perpendicular and at non-orthogonal angles to the line scan direction.

The apparatus required can be minimised by applying down-counting techniques and storing a signal to indicate complete erosion in one direction instead of recirculating large quantities of information from line to line. An overflow signal indicating that erosion has been successfully completed in a second subsequent direction together with the indicator signal from a previous erosion is used to instigate another direction of erosion or to release an output pulse for counting.

24 Claims, 12 Drawing Figures

SUBTRACTIVE IMAGE ANALYSIS

AREA OF INVENTION

This invention concerns the analysis of images using line scanning techniques for generating a video signal which is converted into a series of constant amplitude pulses by threshold detection for subsequent processing and computation.

BACKGROUND TO INVENTION AND PRIOR ART

It is known that if access is available to multiple points in a two dimensional array of delay lines supplied with constant amplitude pulses obtained from threshold detection of a video signal then the output from an AND gate supplied with signals from selected ones of the delay lines will represent an eroded or reduced in size representation of the original feature from which the video signal pulses were derived. Conversely the output of an OR gate supplied with the same signals will be enlarged or dilated version of the signals from the original feature.

It is also well known that the same end result can be obtained using two one dimensional operations in sequence thus reducing the hardware required. Thus a series of short delay lines may be employed to obtain access to the signal corresponding to points at small intervals along a line scan and the outputs from the short delay lines can be supplied to an AND gate the output of which can then be supplied to the input of a series connected line of longer duration delay lines each representing one line scan period and the input and outputs of these lines supplied as the inputs to a further AND gate the output of which will be signals representing an eroded version of the original feature.

Also as is well known it is possible to compare signal values in an AND gate derived from points along a line which is not parallel or perpendicular to the direction of line scan but which lies at an angle to the scan by delaying the signals which are to be compared by a time interval not equal to the line scan period but to the line scan period plus or minus a small increment of time depending on how acute the inclined line is to be to the direction of line scan.

In exactly the same way as previously mentioned with regard to operation parallel and subsequently perpendicular to the direction of line scan, so the operation of comparison of points along lines which are inclined to the line scan direction and are not perpendicular thereto can be performed subsequent to the first two operations by supplying the output of the second AND gate previously referred to to the input of a series of appropriate duration delay lines the outputs of which are supplied to the inputs of a further AND gate. The output of this AND gate will then be signals representative of a further erosion of the original feature shape this time in accordance with the direction of the inclined line.

Further erosion on other inclined lines can be performed in similar ways using subsequent operators.

Such techniques are acceptable provided small amendments only are required to the features but the systems necessary and the hardware required become impossibly cumbersome if a large number of line scans of erosion are required.

One technique to reduce the hardware is to sample every $n$th line and hold the data in that line static for the intervening $(n-1)$ lines. Although this reduces hardware it creates harmonic responses when the features are not solid and incorrect results are obtained from the analysis.

OBJECTS OF INVENTION

It is an object of the invention to provide an improved method and apparatus therefor, for performing controlled erosion on the signals relating to detected features in a scanned image which does not require the considerable hardware required by known erosion systems.

According to the present invention a method of analysing a feature in a field comprises scanning the field to produce a video signal; converting the video signal amplitude excursions to constant amplitude pulses by threshold detection; releasing a series of timing pulses for the duration of each constant amplitude pulse and counting each series of timing pulses so released, the counting circuit being reset in the absence of a timing pulse during a timing interval; generating an overflow signal when the counter reaches a value $n$ and releasing timing pulses for the duration of each overflow signal so generated and analysing (e.g. counting) the timing pulses so released.

The method according to the invention will erode a feature along its leading edge by an amount along each line scan commensurate with the value $n$.

The invention may be extended to provide operation in more than one direction. Thus erosion can be performed additionally in a direction perpendicular to the direction of line scan by feeding the timing pulses released by an overflow signal from the first counter to a second counting circuit the function of which is to increment by unity each of the numbers held in a store and made available in sequence once during each line scan period, depending on the value in the output of the first counter at the corresponding points during each line scan period, and comparing the re-circulated and incremented count values at each point during each line scan period with a numerical value equivalent to $m$ and releasing a first signal for each point during a line scan period when the number which is re-circulated is equal to or greater than $m$ and a second signal, conveniently zero for all points where this is not the case. It will be seen that a first value signal will be obtained from the second counting circuit for any point in respect of which feature has been detected over $n$ points in $m$ consecutive line scans in advance of that point. Features in the field of view will thus have been eroded in two directions by $n$ points in the direction parallel to line scan and by $m$ line scans perpendicular to the direction of line scan.

The second counting circuit is adapted to circulate a zero into the store in place of any other count value for every point along each line scan for which there is no overflow signal from the first counter.

The accumulating numerical value in the store is conveniently in binary coded decimal form and shift registers are employed to store the binary signals, a parallel array of a sufficient number of shift registers being employed to accommodate the maximum number of line scans over which erosion is required.

In the second counting circuit, the first value of the output signal is used to control a number override device for inserting into the store a number which when released by the store one line scan period later will, when incremented by unity, produce a value of $m$, and a zero condition in the output of the second counting circuit will simply cause the incremented numerical value from the store to be transmitted into the input of the store.

In addition to erosion parallel and perpendicular to the direction of line scan, erosion can be performed along a line inclined to the direction of line scan by incorporating an additional second counting circuit supplied with the output signals from the first mentioned second counting circuit and in which the re-circulation time for the store is less or greater than the line scan period by an appropriate amount. The output signals from the further second counting circuit will therefore only correspond to points in the frame scan in respect of which feature has been detected along $n$ points along each of $m$ successive line scans and that $q$ such $n$ by $m$ rectangles have been located on $q$ successive line scans with the position of each successive rectangle being displaced relative to the last by the appropriate angle.

It can be shown that by eroding in this manner first of all parallel, secondly perpendicular, thirdly at 45° and fourthly at 135° to the line scan direction, the number of output signals obtained from the last counting circuit in respect of any detected feature will correspond to the number of times that an octagonal area whose actual dimensions are governed by the chosen values of $n$, $m$, and $q$, the spacing between the line scans and the magnification of the feature in forming the image which is actually scanned will fit into the detected feature area.

Preferably the spacing between points along each line scan at which detected feature is looked for is made equal to the spacing between line scans perpendicular to the line scan direction. in this situation, a preferred shape of octagon is given by making the values $n$, $m$ and $q$ equal so that an octagon is produced whose diameter measured perpendicular and parallel to the line scan direction is in each case equal to three times $n$ (or $m$ or $q$). This shape is a good approximation to a circle and analysis can therefore be carried out virtually independently of the orientation of the field relative to the scanning direction.

The invention is of considerable application in the field of determining the porosity of rock or similar material to molecular flow.

Although the method and apparatus described above represents a considerable saving in the quantity of hardware required over and above previous proposals for performing a similar form of analysis, it is possible to make even greater savings in the number of shift register required.

According to a preferred feature of the present invention erosion or subtractive image analysis is undertaken by counting down rather than counting up. To this end an overflow condition is indicated by zero value in a counter.

The alternative mode of counting makes little difference to the horizontal erosion, that is erosion in a direction parallel to the line scan direction. However great savings in the number of shift registers required can be made by using a counting down principle for the erosion carried out perpendicular and at an angle to the line scan direction.

The preferred feature of the invention derives from the realisation that each of the succession of erosions is formed separately and independently of the others and that once erosion in one direction has been completed this fact alone is sufficient information to carry forward. Thus a single counting circuit including a lone line scan period store is sufficient to store all the count values for all the different modes or erosion provided a parallel memory is available which is read in synchronism with the counting circuit memory to identify what particular mode of erosion each count value in the counting circuit memory refers to.

Although the memory referred to above has been described as a one line scan period memory it will be appreciated that in order to perform erosion at an angle to the direction of line scan access is needed to information delayed by just less than or just greater than one line scan period. Accordingly the single memory device in the counting circuit and the associated memory for storing signals indicating the mode of erosion to which the numerical values refer, contains a tapping or similar access at a point just less than the line scan period, another tapping at exactly the line scan period and a further tapping beyond the line scan period. The increments of time before and after the line scan period are made equal and correspond to the time between the timing pulses with which the detected signal pulses are gated.

As mentioned above a preferred form of scanning involves selecting a frequency for the gating pulses such that if the pulses were displayed on the screen in synchronism with the scanning, they would appear spaced apart in the line scan direction by the same distance as the line scans are separated measured perpendicular to the direction of line scan.

The invention will now be described by way of example with reference to the accompanying drawings.

DETAILED DESCRIPTION OF THE EMBODIMENTS.

Figure 1:
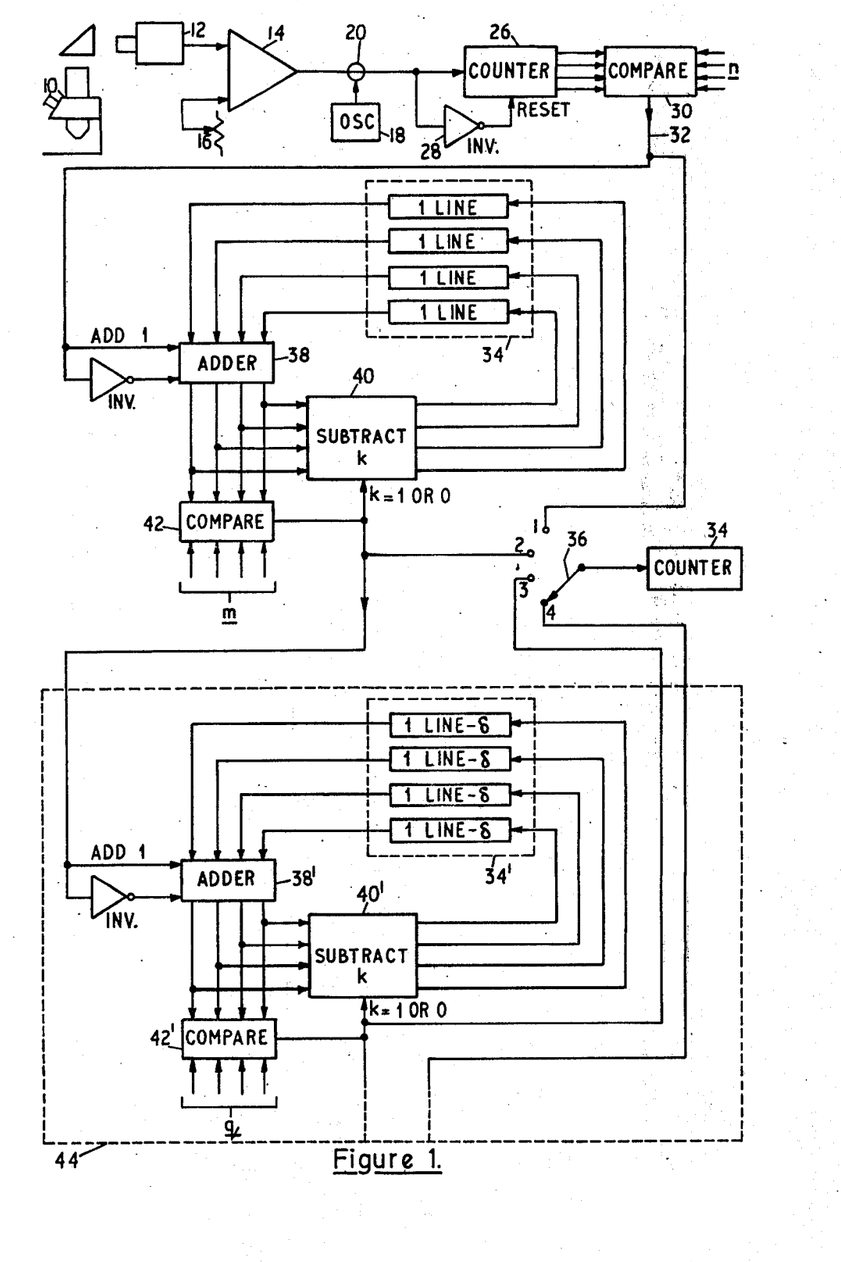
FIG. 1 is a block circuit diagram of part of an image analysis system incorporating the invention.

As shown in FIG. 1 a field (such as a microscope slide) containing features is imaged via e.g. a microscope 10 onto a television camera 12 and a video signal produced from scanning the field image is subjected to threshold detection in a comparator 14 having an adjustable reference voltage source 16. The amplitude excursions of the video signal which satisfy the threshold criterion (e.g. exceeds the reference voltage) are converted to constant amplitude pulses (in known manner) having duration equal to the durations of the amplitude excess over the reference voltage.

Figure 2:
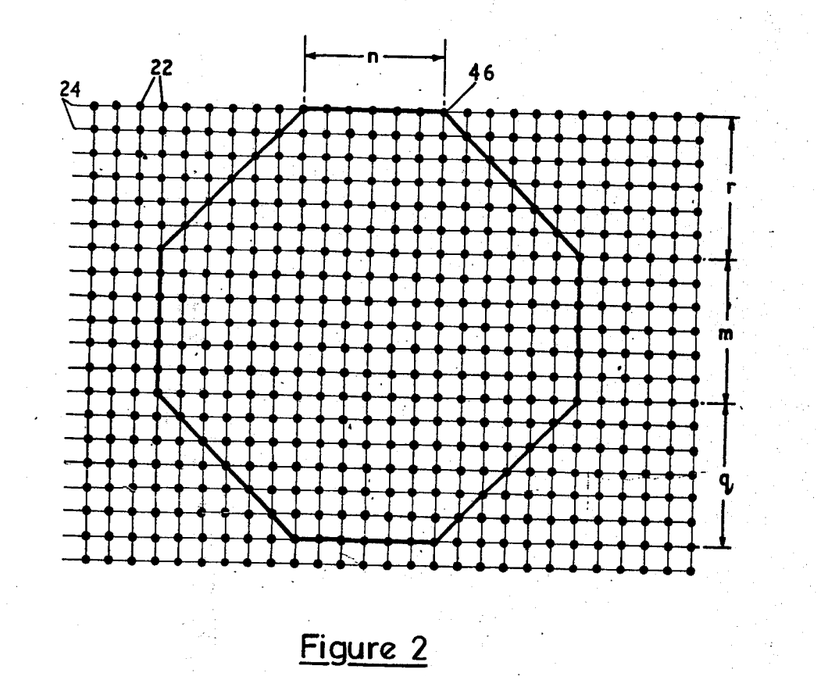
FIG. 2 illustrates one octagonal shape which is produced for fitting into feature shapes for analysis, by erosion in four directions, in accordance with the method of the invention.

The output from the comparator 14 is gated by a high frequency oscillator 18 acting on a gate 20, the frequency of the oscillator being very much greater than the line scan frequency and made equal to a multiple of the line scan frquency such that the horizontal spacing between the points along each line scan at which the gate 20 is opened (shown by the dots 22 in FIG. 2) is equal to the vertical spacing between the line scans 24 (see FIG. 2). Each point at which the gate 20 is opened is termed a picture point (pp.) and a line can therefore be thought of as being made up of Npp.

The effect of gating the output of the comparator 14 is to convert each constant amplitude pulse into a number of spaced apart, shorter duration constant amplitude pulses (known as pp. pulses) one for each picturepoint which lies along the horizontal chord across the feature formed by the intersection of that particular line scan with the feature image.

The pp. pulses are supplied to a counter 26 which is reset in the absence of a pp. pulse for the duration of one picture point interval (re the time between two of the gating pulses from the oscillator 18). This is achieved using an inverting amplifier 28 between the counter input and its reset terminal.

The numerical count value in the counter is compared after each pp. pulse with a selected number $n$ in a digital comparator 30. This device produces a 1-signal on line 32 whenever the count value in counter 30 $\geq n$. The number of 1-signals so produced may be counted on a counter 34 by turning switch 36 to position 1.

The line 32 also provides input signals to a second counting circuit. This latter is comprised of a four line shift register memory 34 whose inputs are connected to its outputs via an adding stage 38 and subtraction stage 40. The adding stage 38 takes the output signals from the memory 34 and adds 1 to each value transmitted thereto. In the absence of a 1-signal at any pp., the adding stage 38 cancels any numerical value therein and transmits zero.

The output from the adder 38 is supplied by subtraction stage 40 to the inputs of the shift register memory 34, and is also compared by digital comparator 42 with a second selected number $m$.

The output of the comparator 42 is supplied as a control signal to the subtraction stage 40 such that when there is a 1-signal at a pp. the subtraction stage reduces the numerical value being supplied to the subtraction stage for that pp. where the control signal is zero at any pp., then the numerical value of the signal appearing in te output of the adder 38 is transmitted unchanged through the subtraction stage 40, for onward transmission to the outputs of the shift registers of the memory 34. Conveniently the shifting pulses for the shift registers are derived from the output of the oscillator 18.

The output pulses from the comparator 42 are supplied to terminal 2 of switch 36 and also to the input of a further counting circuit 44 which is identical to that shown above in FIG. 1, in that it comprises an adder 38' a set of shift registers forming a memory 34, (each of the shift registers having a time delay equal to one line scan period less 1pp. interval), a subtraction stage 40 and a comparator 42', and the circuit functions in exactly the same manner as described with reference to the appropriate circuit of FIG. 1 the output pulses of the one corresponding to the input signals for the other.

One of more further counters such as 44 are provided so that further erosion can be performed if required at different angles to the direction of line scan. For example, by using shift registers having a total time shift equal to a line scan period plus a 1 pp. interval, the erosion, will be performed at 135' to the direction of line scan.

By making the count capacities of the various counter 26, 34 34' etc. the same (i.e. $n=m=q=r$), the resulting inspection shape is a regular octagon as shown at 46 in FIG. 2.

As shown in FIG. 1 the output from any one of the comparators 30, 42, 42' etc. can be selected by switch 36 and the signals released by the comparator 30 counted by the counter 34.

If the count in counter 34 relates to a single frame scan (or average of a plurality of frame scans) the count value will be the total number of time the inspection shape can be fitted into the entire detected feature area in the image.

If the counter 34 is replaced by an associated parameter computer of the type described in U.S. Pat. No. 3,619,494 with the computing circuit elements A, B, C set to count the number of pulses released by the comparator 30 (or 42, or 42' depending on the setting of switch 36) the count values released by gating pulses defining the ACP of each feature will be the number of times the inspection shape can be fitted into each such detected feature.

The logic system of FIGS. 3 to 12 is used for handling the information arising during a frame scan and for performing erosion on the detected signal content arising from scanning features in a field and for generating as an output signal gating pulses which can be counted to indicate the number of times that a given shape can be fitted into either each of the detected features in the field or all of the detected features in the field depending on whether an associated parameter counting circuit is used, or whether the total field count is employed.

Reference is made to FIG. 1 for an indication of the overall system into which a logic system illustrated in FIGS. 3 to 12 can be incorporated.

By way of general background, the logic system which will now be described is designed to take in digital signals from three digital switches or similar adjustable devices so that three values $m$, $q$, $r$ can be selected by the operator to give the number of lines over which each particular erosion operation is to be performed. In the example shown $m$ is the number of line scans of vertical erosion, $q$ is the number of lines of erosion to the right, $r$ is the number of lines over which erosion is carried to the left. For simplicy it is assumed that the scanning rate and repetition frequency of the gating pulses is such as to give a square matrix of inspection points throughout the field as described with reference to our co-pending application so that the picture points at which the signal is sampled by the gating signals are equally spaced apart in both the line scan and perpendicular directions. Furthermore it is assumed that the angle at which left hand and right hand erosion is undertaken is 45° so that the short increment of delay before and after the line scan period in the memory device is the time between two adjacent picture points. A delay having such a time interval is described as a one picture point delay.

Figure 12:
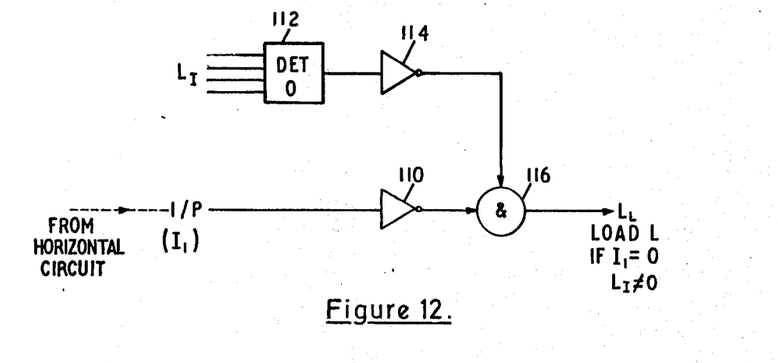

Referring first of all to FIG. 12 the output from a horizontal erosion circuit is supplied as the input signal to the system incorporating the present invention. The horizontal erosion circuit takes the form of a down counter (not shown) which is loaded with the numerical value in binary coded demical form or similar corresponding to the number of picture points of erosion required and the counter produces a one output signal until such time as the counter has been reduced to zero by successive down counting as a result of continued detection of a feature.

When the signal from the horizontal counting circuit reaches zero, inverting amplifier 110 produces a 1-signal. Assuming $I_1$ is zero, a detect zero circuit 112 produces a zero condition in the input of inverting amplifier 114 so that both inputs of AND gate 116 are satisfied and a 1-signal is transmitted known as $L_L$ to one input of an AND gate 118. Although shown as a single device in FIG. 6, AND gate 118 is in fact a complex gate for transmitting a binary coded decimal signal from a digital switch or similar device arranged for operator control to select a numerical value $r$.

Figure 6:
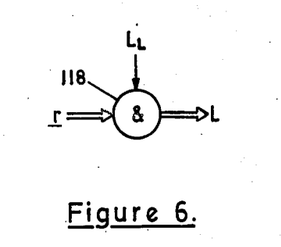
Figure 7:
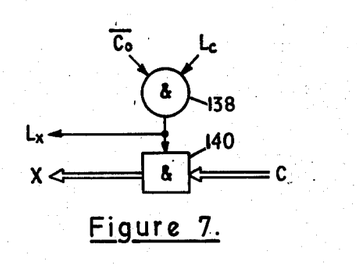
Figure 8:
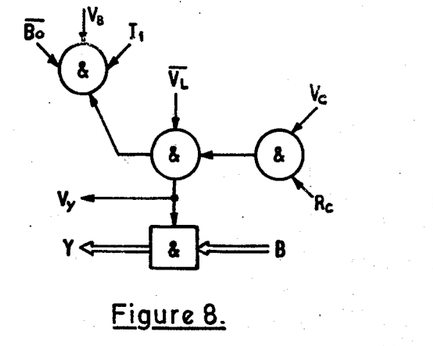
Figure 9:
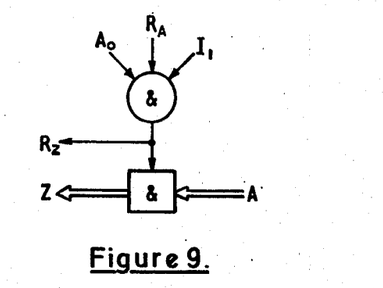

When gate 118 is enabled, $r'$ is transmitted as the value for the number of line scans of left hand erosion and this is applied to one input of a multiple OR gate 120. The output of OR gate 120 is supplied to the inputs of a plurality of parallel connected sift registers generally designated 122 each having a delay equivalent to one line scan period less one picture point interval.

Figure 3:
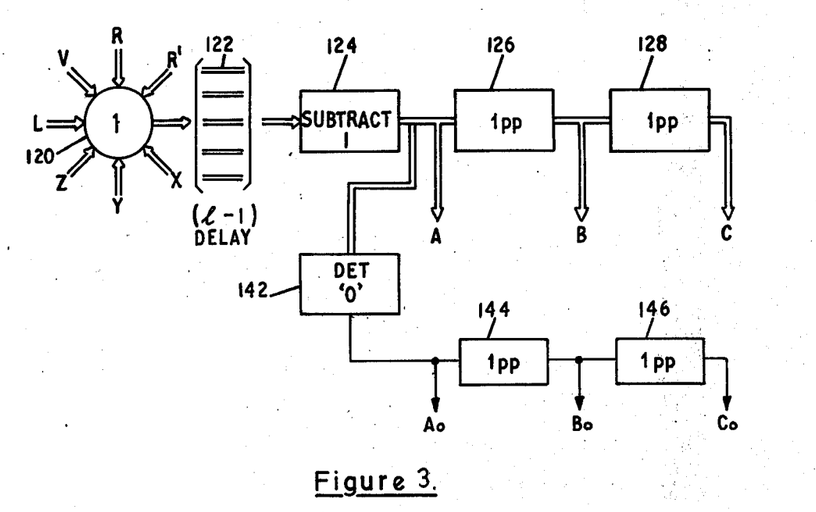
FIGS. 3 to 12 are the circuit diagrams of a complete logic system constructed in accordance with the preferred feature of the invention.
Figure 4:
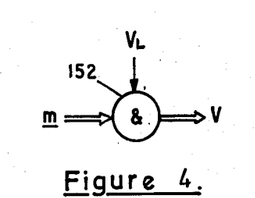

The outputs from the shift registers are fed to a substraction circuit adjusted to subtract one from the numerical value made thereto and this numerical value signal is transmitted as information signal A, via a first picture point interval delay device 126 as information signal B and via a second picture point interval delay device 128 as information signal C.

Simultaneously the 1-condition represented by signal $L_L$ is transmitted via OR gate 130 to a shift register 132 having a total time period equivalent to one line scan period less one picture point period, and thereafter is delayed by two 1-picture point delays 134 and 136. In this way three delayed signals are obtained whose value depends on whether or not feature was detected at that point in the line scan on the previous line scan.

For left hand erosion to be performed the signal $L_c$ from delay 136 is supplied as one input to an AND gate 138 (see FIG. 7) the other input of which is supplied with a one condition if C is not zero. The output from the AND gate constitutes signal $L_x$ which will be referred to later and also provides one input to an AND gate 140 whose collective input is supplied with the binary coded decimal signal C. The gated output version of this signal is described as X and this is supplied as another input to OR gate 120.

A circuit for deriving signals indicating when A, B, and C become zero is also shown in FIG. 3. To this end a zero detector 142 is connected to the output of the subtraction stage 124 and the outputs from the zero detector are supplied along a line containing two one picture point delay devices 144 and 146. The output from the zero detector constitutes $A_o$ the output from the first one picture point delay device 144 constitutes signal $B_o$ and the output from one picture point delay 146 constitutes $C_o$.

Thus for all the time that the input signal to amplifier 110 in FIG. 12 is zero, a numerical value $r$ is supplied to the group of shift registers 122 and a one signal is injected into the shift register 132.

As soon as the input signal becomes a '1', AND gate 116 is inhibited and the value $r$ is prevented from being inserted into the delay line array 122 (compare FIg. 6 with FIG. 12). For all such points along the line scan, zero is entered into the shift register array 122.

Approximately one line scan period later information re-appears in the output of each shift register array 122 and one is subtracted from the numerical value at each picture point by subtraction stage 124.

The reduced numerical value appears successively as signals A, B and C and provided the output from shift register 146 is not zero and that from shift register 136 is also not zero the reduced numerical value C is applied as information signal X to another input of the OR gate 120. It will be seen that provided feature is detected on each of the line scans in the appropriate place, a reducing numerical value will be re-circulated from the output of the parallel shift register array 122 to the input thereof via the OR gate 120. Assuming tyat feature continues to be detected, the 1-condition in the output of delay 146 inhibits the further re-circulation of a reducing value for C via input X in OR gate 120.

Figure 10:
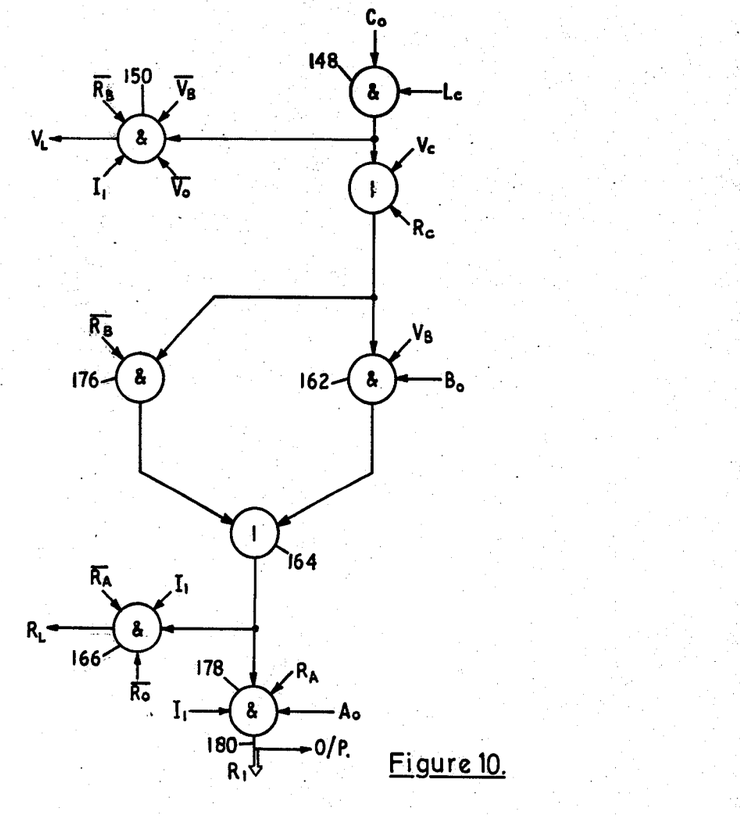

Turning now to FIG. 10, at this condition, both inputs of AND gate 148 are satisfied as also are then all the inputs to AND gate 150 so producing a load V signal $V_1$. This satisfied AND gate 152 of FIG. 4 and causes the numerical value $m$ to be inserted into the bank of shift registers 122 and the V line. Signal $V_1$ also causes a one signal to appear in the output of OR gate 154 and to be transmitted into the shift register 156 made up at its end by two one picture point delays 158 and 160.

When a zero is detected by zero detector 142 and appears as a one signal in the output of delay 144 (i.e. $B_o$ is equal to 1) all the conditions for AND gate 162 are satisfied and a 1-signal is transmitted via OR gate 164 to AND gate 66 which is therefore fully satisfied and a signal $R_L$ (i.e. an instruction to load $r$'s instead of $v$'s) is generated. Note that in this condition AND gate 150 is not satisfied and no further $V_1$ are produced.

Figure 5:
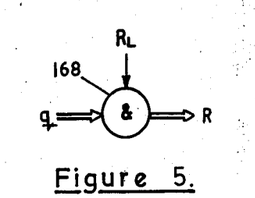

Turning now to FIG. 5 when rl is one, AND gate 168 is satisfied and the numerical value $q$ is inserted via the line R through OR gate 120 into the bank of shift register 122 and in the same manner as previously described, provided the detected feature continues down the scan raster, the value of $q$ is successively reduced by one during each consecutive line scan period until detector 142 detects a zero condition in the output of subtraction stage 124 once again.

Figure 11:
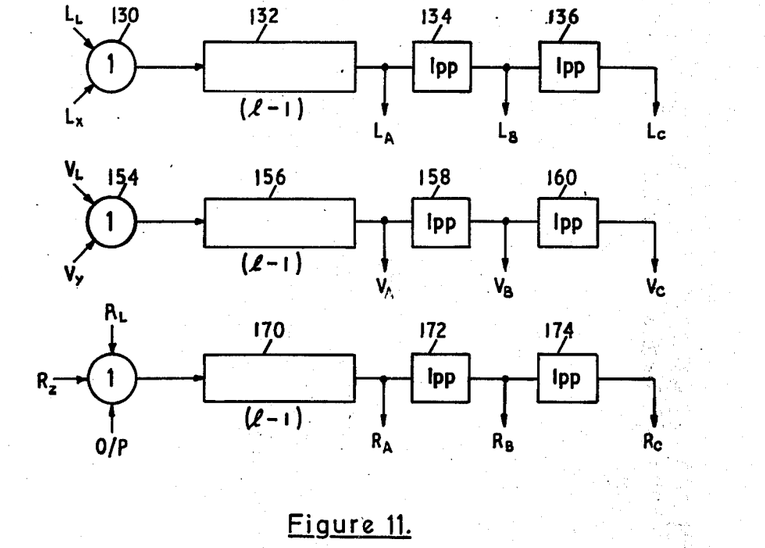

While signal $R_L$ is 1, 1-signals are inserted into the third shift register 170 forming the third shift register of the type memory shown in FIG. 11.

When a zero is detected by detector 142 the output $A_o$ becomes 1 and at this point in time since $R_B$ is 1, both conditions for AND gate 176 are satisfied and this in turn via OR gate 164 produces all the necessary conditions to satisfy AND gate 178 and a 1-signal along line 180 is caused to generate a suitable signal for continual recirculation through the memory 122 along line $R_1$. In this way, provided the feature is continually detected on each line scan, and all the other conditions are satisfied, the circuit generates a value $R_1$ for each line scan which is subsequently re-inserted into the shift register array 122 via OR gate 120. This will continue until the input signal $I_1$ becomes zero or one of the other conditions indicating a successful completion of previous erosions in other directions fails.

The output signals are counted as described above with reference to FIG. 1. The total number of picture point pulses counted by the counter for any one detected feature is the number of times that the inspection shape can be fitted within the feature and if the total number of pulses arising during the complete field scan are counted then the number will be the total number of times that a particular shape can be fitted into all the features in a field. As mentioned above the first measurement can be made by using an associated parameter computing technique in which the number of times the inspection shape can be fitted into each feature is counted separately for each feature and that number released uniquely at the end of scanning each feature.

Reference has been made to a down counter in the description of FIG. 12. The down counter of the type described constitutes a horizontal erosion circuit since gated constant amplitude pulses from gate 20 of FIG. 1 if supplied to such a down counter will not cause the output of the down counter to become zero (the condition looked for by the following circuits) until after a programmed number of gated pulses have been received by the counter. Thus in effect the first $n$ gated pulses from the gate 20 are ignored. Thus if a constant amplitude pulse from the detector 14 corresponds to 25 gating pulses from the oscillator 18 and n is set to 4, the duration of the constant amplitude pulse is effectively eroded to 21 gating pulse durations.

The circuit shown in FIG. 1 or the subsequent modification shown in FIGS. 3 to 12 serves to remove or erode information from the constant amplitude pulses (or more accurately the gated versions of these pulses). The constant amplitude pulses are obtained by comparing the video signal amplitude with a reference voltage. The comparator can be programmed to produce a 1-level constant amplitude pulse whenever the video signal amplitude exceeds the reference voltage (and a zero level at all other times) or it can be programmed to perform the reverse or inverse function i.e. to produce a 1-level constant amplitude pulse whenever the video signal amplitude falls below the reference voltage. The video signal amplitude can be related to the information within the field which is scanned. If the features are darker than the background and the video signal amplitude is low for dark areas which are scanned and is high for light or white areas constant amplitude pulses relating to the line scan intersections with dark features can be obtained by programming the comparator to produce the 1-level constant amplitude pulses whenever the video signal amplitude drops below a certain reference voltage between the dark amplitude level value and the light or white amplitude level value. With the comparator 14 so programmed, the operation of the scanned circuit of FIG. 1 or FIGS. 3 to 12 will erode the information relating to the line scan intersections with the dark features. If however with the same input signal to the comparator 14 it is programmed to perform the reverse function i.e. to produce a 1-level constant amplitude pulse when the video signal amplitude exceeds the reference voltage, then the function of the following circuit of FIG. 1 or FIGS. 3 to 12 will serve to dilate or enlarge the information relating to the line scan intersections.

The signals from e.g. output 4 in FIG. 1 or the corresponding output in FIGS. 3 to 12 can be supplied as an input to a second circuit basically comprising that of FIG. 1 or FIGS. 3 to 12 as described herein, for the purpose of performing an opposite function to that performed by the first such circuit, i.e. erosion of feature information may be followed by dilation.

Where the overall function of the circuit beginning with counter 26 (or the horizontal erosion counter described with reference to FIGS. 3 to 12) is reversed i.e. to cause dilation instead of erosion of the detected features, it is necessary to include an inversion circuit to convert 1-levels to zeros and zero levels to 1-levels in the final output of that circuit.

I claim:

1. A method of analysing a feature in a field comprising:

converting the video signal amplitude excursions to constant amplitude pulses by threshold detection;

releasing a series of timing pulses for the duration of each constant amplitude pulse and counting each series of timing pulses so released;

resetting the counting circuit in the absence of a timing pulse during a timing interval;

generating an overflow signal when the counter reaches a value $n$;

releasing timing pulses for the duration of each overflow signal so generated; and analysing the timing pulses so released.

2. A method as set forth in claim 1 further comprising counting the released timing pulses.

3. A method as set forth in claim 1 further comprising the steps of resetting the counting circuit, in the absence of a timing pulse during a timing interval, to a numerical value N, decrementing the numerical value in the counter by one for each timing pulse supplied to the counter, and generating the overflow signal when the numerical value in the counter is zero.

4. A method as set forth in claim 1 comprising the steps of:

Counting the timing pulses released by an overflow signal from the first counter in a second counting circuit in which a plurality of numbers are held in a store and are made available in sequence once during each line scan period;

incrementing by one each number so made available if the first counter is generated an overflow signal at the time;

comparing the incremented count value at each point during each line scan period with a numerical reference value $m$;

generating at each such timing point an output signal pulse having a first value when the incremented count value is equal to or greater than $m$ and a second value at all points where this is not the case; and inserting a numerical value signal into the store to be recycled and to be available for further incrementation at the appropriate point during the next line scan.

5. A method as set forth in claim 4 further comprising counting the first value output signal pulses.

6. A method as set forth in claim 4 further comprising inserting a zero into the store in place of a count value at any point along each line scan for which there is no overflow signal from the first counter.

7. A method as set forth in claim 4 further comprising:

inserting into the store a signal having a numerical value of $(m-1)$ in response to a first value of the output signal from the second counting circuit, so that if the output signal from the second counting circuit is at its said first value at the appropriate point along the next line a numerical value of $m$ will again be generated.

8. A method as set forth in claim 4 in which the numbers held in the store are made available from line to line at intervals of exactly one line scan period.

9. A method as set forth in claim 4 in which the numbers held in the store are made available from line to line at intervals of less than one line scan period.

10. A method as set forth in claim 4 in which the numbers held in the store are made available from line to line at intervals of greater than one line scan period.

11. A method of analysing a feature in a field set forth in claim 4 further comprising the steps of:
counting the first value output signal pulses generated by the said second counting circuit in a third counting circuit in which a plurality of numbers are held in a store and made available in sequence once during each line scan period;
incrementing by one each number so made available if the second counter is generating a first value output signal pulse at the time;
comparing each incremented count value in the second counting circuit at each point during each line scan period with a numerical reference value $n$; and
generating at each such timing point a second output signal pulse having a first value when the incremented count value is equal to or greater than $n$ and a second value at all points where this is not the case.

12. A method as set forth in claim 11 further comprising counting the said second output signal pulses of first value.

13. A method of analysing a feature in a field as set forth in claim 12 further comprising the steps of counting the said second output signal pulses having a first value in a fourth counting circuit in which a plurality of numbers are held in a store and made available in sequence once during each line scan period;
incrementing by one each number so made available if the third counting circuit is generating a said second output signal of first value at the time;
comparing each incremented count value at each point during each line scan period with a numerical reference value $q$; and
generating at each such timing point a third output signal pulse having a first value when the incremented count value is equal to or greater than $q$ and a second value at all points where this is not the case.

14. A method as set forth in claim 13 further comprising counting the said third output signal pulses having first value.

15. A method as set forth in claim 14 further comprising the step of making available the numbers held in the respective stores of the said second, third and fourth counting circuits at different intervals of time, the interval being exactly one line scan period for one store, less than one line scan period for another store and greater than one line scan period for the other store.

16. A method of analysing a feature in a field comprising the steps of:
scanning the field to produce a video signal;
converting the video signal amplitude excusions to constant amplitude pulses by threshold detection;
generating constant frequency timing pulses;
sampling the signal made up of the constant amplitude pulses K times during each line scan by K equally spaced apart signals derived from the timing pulses occurring during this line scan, generating an electrical signal corresponding to a numerical value N, inserting the generated signal into an electrical store having at least K series locations;
operating the electrical store in synchronism with the timing pulses to shift signals therein from one location to the next so that the signals therein are caused to appear in turn at the output thereof during each line scan;
reducing by one the numerical value of the signal in the output of the store and transferring this reduced value signal to the store input for recirculation;
comparing the reduced value signal with a programmed value;
generating a first output signal pulse whenever the signal transferred to the input of the store is zero;
counting all such first output signal pulses; generating in response to a detected zero signal condition a signal corresponding to one; and
inserting the signal having a numerical value of one into the store in place of the zero condition, so that a zero condition will be produced after reduction by one on the next line scan if an overflow signal is again available at that timing position on the next line scan.

17. A method as set forth in claim 16 in which the steps of counting the first output signal pulses, detecting the zero signal condition and generating in response thereto a signal corresponding to one for inserting in the store are replaced by the steps of:
detecting the zero signal condition;
generating in response thereto a signal corresponding to M; inserting the signal corresponding to M into the store in place of the zero condition, simultaneously generating a first indicator signal;
inserting the first indicator signal into a second store operating in synchronism with the first store, the second store also having at leat K series locations so that all the indicator signals are caused to appear at the output thereof in turn;
generating a first output signal pulse whenever the signal to be transferred from the output of the first store to the input thereof becomes zero and for which signal there is also a first indicator signal in the second store;
counting all such first output signals;
detecting the zero output signal condition; and
generating in response thereto a signall corresponding to one and inserting the one value signal into the first store in place of the zero signal and generating again a first output signal pulse at that timing position if the first indicator signal is still available from the second store at that timing position.

18. Apparatus for analysing a feature in a field comprising, in combination;
means for forming an image of the field;
means for scanning the field in a series of parallel lines to produce a video signal;
means for threshold detecting the video signal amplitude excursions to produce a signal comprised of constant amplitude pulses;
means for gating the signal comprised of constant amplitude pulses at regular intervals along each line scan thereby to produce a series of timing pulses for the duration of each constant amplitude pulse;
means for counting timing pulses so released;
means for resetting the counting circuit in the absence of a timing pulse during the timing interval between timing pulses;
means for generating an overflow signal when the counter reaches a value $n$;
means for releasing timing pulses for the duration of each overflow signal so generated; and
means for analysing the timing pulses so released.

19. Apparatus as set forth in claim 18 further comprising means for counting the timing pulses released during each overflow signal.

20. Apparatus as set forth in claim 18 further comprising a second counting circuit for counting the timing pulses released by an overflow signal, said second counting circuit comprising:
   a store for storing a plurality of numbers;
   means for stepping the store in synchronism with the timing pulses to make available the said plurality of numbers in sequence during each line scan period;
   means for incrementing each number so made available by one if the first counter is generating an overflow signal during that timing interval;
   means for comparing the incremented count value at each point during each line scan period with a numerical reference value $m$; and means for generating at each such timing point an output signal pulse having a first value when the incremented count value is equal to or greater than $m$ and a second value at all points where this is not the case.

21. Apparatus as set forth in claim 20 further comprising means for counting output signal pulses having a first value.

22. Apparatus for analysing a feature in a field comprising;
   means for forming an image of the field;
   means for scanning the field in a series of parallel lines to produce a video signal;
   means for threshold detecting the video signal amplitude excursions to produce a signal comprised of constant amplitude pluses;
   means for sampling the signal comprised of constant amplitude pulses at regular intervals during each line scan to produce a series of timing pulses for the duration of each constant amplitude pulse;
   counting means for receiving timing pulses released during each such constant amplitude pulse;
   means for generating a signal corresponding to a programmed numerical value N;
   means for inserting the generated electrical signal corresponding to N into the counting circuit whenever a timing pulse is not released during a timing interval;
   means for reducing the numerical value in the counter by one for each timing pulse supplied to the counter;
   means for generating an overflow signal when the numerical value in the counter reaches a programmed value;
   means for releasing subsequent timing pulses for the duration of each overflow signal so generated; and
   means for analysing the timing pulses so released.

23. Apparatus as set forth in claim 22 further comprising means for counting the timing pulses released during each overflow signal.

24. Apparatus as set forth in claim 22 wherein the means for analysing the timing pulses comprises:
   a store having at least K series locations and operable in synchronism with the timing pulses for shifting signals from location to the next so that each signal is caused to appear at the output of the store in turn during each line scan;
   means for generating an electrical signal having a numerical value M;
   means for inserting the generated electrical signal M into the store at each of said locations;
   means for transferring the signal appearing at the output of the store to the input thereof for recirculation;
   means operable by an overflow signal pulse from the first counter to reduce by one the numerical value of the signal transferred at any timing interval;
   means for generating a first output signal pulse whenever the output becomes zero;
   means for counting all such first output signal pulses;
   means for detecting when the decremented signal reduces to zero;
   means for generating in response to a detected zero condition a signal corresponding to one; and
   means for inserting the signal corresponding to one into the store in place of the zero signal to produce a zero condition after reduction by one on the next line scan if an overflow signal is again available at that timing position on that next line scan.

\* \* \* \* \*